United States Patent [19]

Cowan et al.

[11] Patent Number: 5,370,185

[45] Date of Patent: Dec. 6, 1994

[54] MUD SOLIDIFICATION WITH SLURRY OF PORTLAND CEMENT IN OIL

[75] Inventors: Kenneth M. Cowan, Sugar Land; Arthur H. Hale, Houston, both of Tex.

[73] Assignee: Shell Oil Company, Houston, Tex.

[21] Appl. No.: 117,816

[22] Filed: Sep. 8, 1993

[51] Int. Cl.$^5$ .............................................. E21B 33/14
[52] U.S. Cl. ...................................... 166/293; 175/72
[58] Field of Search .................... 166/293; 175/65, 72; 106/724, 819

[56] References Cited

U.S. PATENT DOCUMENTS

| | | | |
|---|---|---|---|
| 2,822,873 | 2/1958 | Harmsen et al. | |
| 2,890,169 | 6/1959 | Prokop | 166/293 |
| 3,145,774 | 8/1964 | Patchen | 166/293 |
| 3,499,491 | 3/1970 | Wyant et al. | 166/292 |
| 3,557,876 | 1/1971 | Tragesser | 166/292 |
| 4,897,119 | 1/1990 | Clarke . | |
| 5,016,711 | 5/1991 | Cowan | 166/250 |
| 5,020,598 | 6/1991 | Cowan et al. | 166/293 |
| 5,058,679 | 11/1991 | Hale et al. | 166/293 |
| 5,072,794 | 12/1991 | Hale et al. | 175/50 |
| 5,085,282 | 2/1992 | Hale et al. | 175/40 |
| 5,213,160 | 5/1993 | Nahm et al. | 166/292 X |
| 5,238,064 | 8/1993 | Dahl et al. | 166/293 |

*Primary Examiner*—George A. Suchfield

[57] ABSTRACT

A cementitious slurry is produced by combining an aqueous drilling fluid with a slurry of Portland cement in oil. Generally the drilling fluid is an aqueous drilling fluid containing clay such as prehydrated bentonite. The resulting composition has a particular utility in primary cementing operations for oil wells.

2 Claims, No Drawings

MUD SOLIDIFICATION WITH SLURRY OF PORTLAND CEMENT IN OIL

BACKGROUND OF THE INVENTION

This invention relates to drilling fluid solidification.

The drilling of boreholes is generally carried out using a rotary drilling process. The rotary drilling of a borehole is accomplished by rotating a drill string having a drill pipe and a drill bit at its lower end. Weight is applied to the drill bit while rotating to create a borehole into the earth. The drill string is hollow and sections are added to the drill string to increase its length as the borehole is deepened. This rotary drilling process creates significant amounts of friction which produces heat along with fragments of the strata being penetrated. The fragments of the strata must be removed from the borehole and the drill bit must be cooled to extend its useful life. Both of these necessities are accomplished by the circulation of a fluid down through the drill string and up to the surface between the drill string and the wall of the borehole.

Once the borehole has been drilled to the desired depth, it may be desirable to isolate the separate areas, zones or formations transversed by the borehole. For extraction of fluids from formations, a conduit (casing) must be inserted into the borehole extending from the surface downward, and liners my be hung inside the casing.

At this point it becomes necessary to fill the annulus between the casing and the borehole wall or between the liner and casing with a material which will seal the annulus (interfacial sealing) to inhibit communication between various formations penetrated by the wellbore and which will provide structural support for the casing or liner. This is commonly referred to as primary cementing.

Generally, the borehole into which the casing or liner is introduced is filled with drilling mud. Conventional Portland cement and conventional drilling muds are incompatible. Thus, a mixture of conventional Portland cement and conventional drilling mud will not set up into a strong cement. In addition, the viscosity of such mixtures becomes uncontrollable and may either become too viscous to pump or may get thinner. Portland cement contains a significant amount of soluble calcium, much of it in the form of calcium hydroxide (lime). The calcium can flocculate the clays and some types of polymers used in drilling fluids. This can result in severe rheological problems, poor fluid loss control and filter cake quality. Also, some additives in drilling fluids complex this calcium thus interfering with the hydration reactions for Portland cement.

At the completion of drilling, the used drilling fluid is displaced from the borehole using some means to keep it separate from the cement to follow. This creates two problems. First, the means developed by the industry to keep the drilling fluid separate is relatively complex, involving the use of a landing collar and a pair of wiper plugs. In addition, the thus-displaced drilling fluid must be disposed of. Wyant et al, U.S. Pat. No. 3,499,491 Mar. 10, 1970) proposed a partial solution to this problem by mixing a cementitious material such as Portland cement with powdered sodium silicate glass (to accelerate the set and overcome retarding effects of some of the mud additives) and a treated drilling fluid. While this does solve the problem of drilling fluid disposal since the drilling fluid is incorporated into the cement, it necessitates the use of extraneous components in order to achieve a sufficient degree of compatibility to make the cement work at all.

Thus, almost a century after oil well cementing began, the problem of incompatibility between Portland cement and ordinary aqueous drilling fluids still precludes significant commercial use of used drilling fluid to produce cementitious slurries with Portland cement.

It would thus be desirable to solidify aqueous drilling fluids with Portland cement. It would be desirable to produce cement from used drilling fluid which has high strength. It would further be desirable to produce a cement from drilling fluid and Portland cement without the need to use silicate glass and to avoid, as much as possible, the immediate rheological problems caused by the addition of Portland cement to aqueous drilling fluids.

SUMMARY OF THE INVENTION

It is an object of this invention to solidify an aqueous drilling fluid with Portland cement;

It is a further object of this invention to provide a high strength cement from used aqueous drilling fluid and Portland cement; and It is yet a further object of this invention to provide a compatible cementitious slurry from Portland cement and aqueous drilling fluid without the addition of powdered silicate glass.

In accordance with this invention, a composition comprising a slurry of Portland cement and oil is combined with an aqueous drilling fluid.

DETAILED DESCRIPTION OF THE INVENTION

It has been found that an aqueous drilling fluid and Portland cement can be combined to give a compatible cementitious slurry if the Portland cement is first combined with oil which prevents contact between the Portland cement particles and clay or other ingredients of drilling fluid which otherwise react adversely with the Portland cement.

Definitions

By "cementitious slurry" is meant a slurry comprising Portland cement and aqueous drilling fluid.

By "direct fluid contact" between a displacement fluid and the cementitious slurry is meant that the displacement fluid directly contacts the upper surface of the column of cementitious slurry as opposed to having a solid wiper plug and/or spacer fluid disposed between the cementitious slurry and the displacement fluid. By "direct fluid contact" between the cementitious slurry and the drilling fluid or mud is meant that the cementitious slurry directly contacts the upper surface of the column of drilling fluid or mud as opposed to having a wiper plug with a rupturable diaphragm and/or spacer fluid disposed between the cementitious slurry and the drilling fluid or mud.

The term "pipe" means either a casing or a liner.

The term "primary cementing" refers to any cementing operation wherein a cementitious slurry is passed into an annulus surrounding a pipe and thus encompasses both the cementing of casings wherein the annulus is between the casing and the borehole wall and the cementing of liners where the annulus includes an annulus between the liner and the casing.

As used herein "down" or "in" as it relates to a drill string or casing means in a direction toward the farthest reach of the borehole even though in some instances the borehole can be disposed in a horizontal position. Similarly, "up" or "out" means back toward the beginning of the borehole.

Aqueous Drilling Fluid

The aqueous drilling fluid can be either a water external oil emulsion or an aqueous drilling fluid containing essentially no oil, with the latter being preferred. The drilling fluid serves primarily to provide the water for the cementitious slurry. However, as a secondary matter, the drilling fluid contains solids and thus provides solids for the ultimate cementitious slurry. The drilling fluid can contain any of the additives normally associated with aqueous drilling fluids such as fluid loss additives, rheology control agents (viscosifiers), weight materials, shale stabilizers and deflocculants. Almost always the aqueous drilling fluids contain clay. The clay may be a part of the drill solids produced during drilling. Additionally, a clay such as prehydrated bentonite may be present as a fluid loss control agent.

Suitable deflocculants include carboxylate polymers such as water soluble carbohydrate polymers manufactured by Grain Processing Company under the trade name "MOR-REX".

Suitable fluid loss additives found in drilling fluids include in addition to bentonite clay, carboxymethylated starches, starches, carboxymethyl cellulose, synthetic resins such as "POLYDRILL" by SKW Chemicals, sulfonated lignite, lignites, lignin, or tannin compounds. Weight materials include barite, calcium carbonate, illmentie, titanium dioxide, and hematite, for example. Shale stabilizers that are used in drilling fluids include hydrolyzed polyacrylonitrile, partially hydrolyzed polyacrylamide, salts including NaCl, KCl, sodium or potassium formate, sodium or potassium acetate, polyethers and polycyclic and/or polyalcohols. Viscosifying additives can be used such as biopolymers, starches, attapulgite and sepiolite. Additives are also used to reduce torque. Suitable thinners such as chrome and chrome free lignosulfonates, sulfonated styrene maleic-anhydride and polyacrylate may also be used depending upon the mud type and mud weight. Lubricating additives include nonionic detergents and oil (diesel, mineral oil, vegetable oil, synthetic oil and fish oil), for instance. Alkalinity control can be obtained with KOH, NaOH or CaO, for instance. In addition, other additives such as corrosion inhibitors, nut hulls etc. may be found in a typical drilling fluid. Of course, drill solids including such minerals as quartz and clay minerals (smectite, illite, chlorite, kaolinite, etc.) may be found in a typical mud.

If desired, a polyalcohol can be utilized to improve the bonding of the cement. Suitable polyalcohols are disclosed in Cowan and Hale, U.S. Pat. No. 5,020,598 (Jun. 4, 1991) and Hale and Cowan, U.S. Pat. No. 5,058,679 (Oct. 22, 1991), the disclosures of which are hereby incorporated by reference.

If a polyalcohol is used, it may be desirable in some instances to use one modified with an epoxy resin.

The epoxy resin can be used in an amount sufficient to give 0.5 to 5 wt % material from the epoxy resin incorporated in the epoxy polyethercyclicpolyol. Alternatively, a relatively high epoxy content can be utilized, say 6 to 75, preferably 20 to 45 wt %. Thus, viewed in terms of the polyol, the epoxy component content can vary from 0 to 67 wt % based on the total weight of the polyol.

The initial pressure can be higher when making the higher epoxy material as compared with the initial pressure preferred for the polyetherpolyols in general as disclosed in said Hale and Cowan patent. For instance, the initial pressure can be greater than 180 torr. Generally, the initial pressure will be between 250 and 500, preferably 250–350 torr, i.e., a vacuum, when the starting polyhydric alcohol component is glycerine. If desired, the reaction can be terminated before 1.107 moles of water per mole of polyol reactant are removed. Preferably, the polyhydric alcohol monomer is introduced into the reaction zone in a single addition and the epoxy introduced in a plurality of additions, preferably 2 to 10, most preferably 3 to 6 when utilizing the higher epoxy. Generally, if higher epoxy-containing materials are being produced, more additions are utilized and the addition of the epoxy could be continuous. With the high epoxy content materials diglycidyl ethers are preferred instead of the tri- and tetraglycidyl ethers.

Another class of polyalcohols is ethoxylated propoxylated alcohols of the following general formula

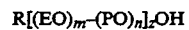

where
EO = an ethoxy unit
PO = a propoxy unit
R = an alkyl chain of 2–16 carbon atoms, preferably 3–16, most preferably 4–10 carbon atoms. At least one of m or n is greater than zero. In these EO/PO copolymer, m and n are variable and the sum of m plus n determines their number average molecular weight, which ranges from 500 to 15,000, preferably from 600 to 10,000. Mixtures of water soluble and water insoluble alcohols can be used because of the improved interfacial sealing and reduced fluid loss which the combination provides.

The density will vary depending on the density needed for the particular drilling operation being carried out and may range anywhere from about 8.5 to about 20 lbs/barrel, but generally will be in the range of 11 to 15 lbs/barrel.

Portland Cement Oil Slurry

The slurry of Portland cement and oil can be prepared simply by combining Portland cement with oil. However, it is generally desirable to have a relatively high concentration of the solids (Portland cement) in the oil slurry. Hence, it is generally desirable to use a surfactant so as to disperse the Portland cement in the oil and allow for higher concentrations. Generally the slurry will contain 10–65 volume percent solids based on the total volume of the Portland cement and oil slurry, preferably 15–50, more preferably 25–45 volume percent solids based on the total volume of slurry.

If desired, a viscosifier can be used to suspend the cement in the oil. Suitable viscosifiers include organophilic clays (including those of the type used in oil muds) and viscosity index improvers (VI) of the type used in motor oils. The viscosifier can be used in an amount within the range of 0.1 to 6, preferably 0.2 to 3.5, more preferably, 0.5 to 2 wt % based on the weight of the oil.

In the instances where a surfactant is used it is preferred to use a surfactant of the type which oil wets the Portland cement in the absence of water and water wets the Portland cement in the presence of water. Such surfactants are well known and include the following:

1. Tall oil fatty acids such as "ACINTOL FA-1" by Arizona Chemical Co.,
2. Fatty amides such as "PRODUCT 5005" from Champion Chemical Special Products Division,
3. Ethoxylated sorbitan derivatives such sorbitan monooleate, sorbitan monostearate, sorbitan monolaurate, sorbitan trioleate, sorbitan tristearate. Examples of these products are the "TWEEN" series of surfactants from ICI Americas, Inc., i.e., "TWEEN 40", "TWEEN 61", "TWEEN 65" and the "T-MAZ" series of surfactants such as "T-MAZ 20K", "T-MAZ 60K", "T-MAZ 65K", "T-MAZ 80K" from PPG/Mazer,
4. Ethoxylated tallow or stearyl amines such as the "TRYMEEN" series from Kenkel Corp. Examples are "TRYMEEN 6606", 6607, 6609, 6610and 6617, and
5. Ethoxylated linear alcohols such as "NEODOL 23-1" by Shell Chemical Company.

It is usually desirable to use a mixture of surfactants because the emulsions formed depend upon the water-oil-solids ratios, type of surfactants (HCB) and energy applied to mixing. A variety of surfactants helps control rheological properties.

Also, sulfonated lignins (sulfonated kraft lignins), lignins amines, lignosulfonates and polynaphthalene sulfonates can be used to control rheological properties in the oil slurry, mud and mixtures thereof. That is, these materials can be used in the initial preparation of the Portland cement in oil dispersion, the emulsification of the oil slurry in the drilling fluid or both. The "REAX" series of dispersants from WESTVACO can be useful.

The Portland cement can be any conventional Portland cement used in drilling cementing such as those designated as API Class A, B, C, E, G or H (or ASTM Type I, II, III, OR IV). The particle size can that normally found in commercial Portland cement or, if desired, a more finely ground material can be used.

By "oil" is meant any normally liquid water insoluble hydrocarbon. Suitable oils include diesel oil, crude oil, vegetable oil and synthetic oils such as a sheen-free synthetic oil sold by MI Drilling Fluids under the trade name "NOVASOL".

Ratio of Components

It is desirable to have a water to Portland cement weight ratio of about 0.15 to 0.60 preferably 0.25 to 0.35. There is, however, considerable leeway in the upper end of this range since, as will be discussed hereinafter, the Portland cement under the conditions of this invention tends to imbibe just the right amount of water to give optimum strength.

In any event, depending on the density of the aqueous drilling fluid and the solids concentration of the oil slurry of Portland cement, the two components are combined in an amount sufficient to give about 20 to 600 preferably 100 to 500more preferably 150 to 350, pounds of Portland cement per barrel of final cementitious slurry (lbs/bbl).

The oil slurry of Portland cement and aqueous drilling fluid can simply be combined without the incorporation of any additional ingredients or an additional surfactant can be incorporated at this point either by incorporating the surfactant with the drilling fluid or adding essentially simultaneously the drilling fluid, oil slurry and surfactant. If a surfactant is used it can include the following:

1. Ethoxylated linear alcohols such as "NEODOL 45-7", 23-12, 25-12, 23-5, 45-13, and 91-8, by Shell Oil Company,
2. Ethoxylated linear alcohol sulfates such as "NEODOL 23-35", 25-35, 45-95, 45-2.25S, by Shell Chemical Company,
3. Ethoxylated linear alcohol sulfonates such as "AVANEL S-150" from PPG/Mazer,
4. Ethoxylated nonyl phenols such as "POLYGLYCOL 34" by Dow Chemical Co., or "POLYTERGENT B" by Olin Corporation,
5. Quaternary ammonium chloride surfactants such as "ARQUAD C-50", "ARQUAD 2C-75" by Akzo Chemical,
6. Block copolymers of propylene oxide and ethylene oxide such as the "PLURONIC" series from BASF Corporation, and
7. Amphoteric fatty acid amine salts such as "Mafo-13" by PPG/Mazer.

The surfactants used in the preparation of the cement slurry in oil and the surfactants, if any, used in emulsifying the oil slurry in the drilling fluid should be ionically compatible. Thus for instance, a mixture of anionic and cationic surfactants would not be used.

Prehydrated bentonite, if used, is generally present in an amount within the range of 1–100, preferably 10–30, more preferably 15–25 lbs/bbl based on final barrels of drilling fluid.

Displacement

As noted above, the oil prevents ready contact between the Portland cement particles and materials such as clay in the drilling fluid which would cause adverse reactions such as thinning, thickening, or precipitation. This, then, facilitates the mixing above ground to produce the cementitious slurry which is then used to displace drilling fluid to carry out the cementing operation. To a large extent the Portland cement is still protected from incompatible components in drilling fluid as it is introduced to the wellbore.

Consequently, while conventional displacement techniques can be used to displace the drilling fluid, because of this compatibility factor, wiper plugs and spacer fluids can be omitted. Thus, the cementitious slurry can be placed in direct fluid contact with the drilling fluid and the drilling fluid displaced out of the annulus between a pipe being cemented and a surrounding wall. The cementitious slurry, then, in turn, can be displaced to a preselected location in the annulus by direct fluid contact with the displacement fluid such as seawater or additional drilling fluid.

Setting

The water becomes available to the cement for hydration by an osmosis-like process across a semi-permeable membrane of oil and surfactant between the water droplets and the cement particles. As osmotic pressure causes water molecules to migrate across the semi-permeable membrane from the high vapor pressure (wet) water droplets to the low vapor pressure (dry) cement particles. Water molecules arriving at the cement combine with the "water thirsty" cement particles to form calcium silicate hydrate crystals. The calcium silicate hydrate crystals grow and extend through the surrounding oil phase, link together, and form a competent set cement structure. As long as the vapor pressure of the cement particles remains low, the osmosis of water occurring in the cement hydration reactions will continue. The majority of water present in the mud is consumed by the cement hydration reactions, and the emulsion droplets are used up as the oil mud cement sets. The water-internal emulsion does not break during setting. The oil remains evenly dispersed in the set mass, and no water or oil separates from the set oil mud cement. Any separated fluids would produce undesirable channels in the set oil mud cement.

The hydration reactions are accelerated by increased temperature, which increases the chemical potential (vapor pressure driving force), and by high mechanical shear during preparation and well operations. This mechanical energy helps to generate a large number of small water droplets which lie closer to the cement particles. Cement accelerators, if used, increase the rate of early strength development by decreasing the dormant or induction period in the hydration of Portland cement.

Since the drilling fluids usually utilize water containing dissolved salts such as sodium chloride, these salts will be present in the water of the cementitious slurry. Salts may be present in an amount within the range of 0.1 to 26 wt %, preferably 3-20 wt % in the case of sodium chloride based on the weight of the continuous water phase. One suitable source is to use seawater or a brine solution simulating seawater. Here, again, the usual intolerance of Portland cement to brine is avoided or at least mitigated because of the presence of the oil.

Other salts suitable for use in the drilling fluids in addition or instead of sodium chloride include, but are not limited to, NaBr, KCl, $CaCl_2$, $NaNO_3$, $NaC_2H_3O_2$, $KC_2H_3O_2$, $NaCHO_2$, $CsCHO_2$ and $KCHO_2$. Sodium chloride is usually preferred, as noted above. These salts can be used, if desired, from 0.1 wt % up to the saturation point under the conditions employed.

EXAMPLE 1

This Example shows that Portland cement can be dispersed in oil, combined with drilling fluid, and after a time, set to a good cement. The emulsion allows time to mix and put the resulting cementitious slurry in place without undesirable reactions between the Portland cement and the drilling fluid.

Base Oil: Mineral oil Grade 9NF
Cement Type: ASTM Type I
Base Mud: Fresh Water+20 lbs/bbl Bentonite+0.05 lb/bbl "DRISPAC" Regular+25 lb/bbl "REV-DUST" (simulated drill solids). Density: 9.2 lbs/gal 350 mls Mineral Oil+8.64 g Sorbitan monooleate, 20 mole ethoxylate ("TWEEN 60")+5.76 g $C_{12}$–$C_{13}$ linear alcohol, 3 mole ethoxylate sulfate ("NEODOL 23-3S ")[1]+2.88 g $C_{14}$–$C_{15}$ linear alcohol, 7 mole ethoxylate ("NEODOL 45-7")[1]+1000 g ASTM Type I cement. Final density of oil cement slurry mixture: 15.89 lbs/gal.

[1] Trade names of Shell Chemical Company

| Volume Fraction Cement Oil Slurry | Volume Fraction Water Base Mud | Final Density lbs/gal | Volume Percent Cement Solids in Mixture | Compressive Strength psi |
| --- | --- | --- | --- | --- |
| 1 | 0 | 15.89 | 46.66 | 0 |
| 0.95 | 0.05 | 15.6 | 44.33 | |
| 0.9 | 0.1 | 15.2 | 42.00 | |
| 0.85 | 0.15 | 14.9 | 39.66 | |
| 0.8 | 0.2 | 14.6 | 37.33 | 705* |
| 0.75 | 0.25 | 14.2 | 35.00 | |
| 0.7 | 0.3 | 13.9 | 32.67 | |
| 0.65 | 0.35 | 13.5 | 30.33 | |
| 0.6 | 0.4 | 13.2 | 28.00 | 1411 |
| 0.55 | 0.45 | 12.9 | 25.67 | |
| 0.5 | 0.5 | 12.5 | 23.33 | |
| 0.45 | 0.55 | 12.2 | 21.00 | |
| 0.4 | 0.6 | 11.9 | 18.67 | 425 |
| 0.35 | 0.65 | 11.5 | 16.33 | |
| 0.3 | 0.7 | 11.2 | 14.00 | |
| 0.25 | 0.75 | 10.9 | 11.67 | |
| 0.2 | 0.8 | 10.5 | 9.33 | 30 |
| 0.15 | 0.85 | 10.2 | 7.00 | |
| 0.1 | 0.9 | 9.9 | 4.67 | |
| 0.05 | 0.95 | 9.5 | 2.33 | |
| 0 | 1 | 9.2 | 0.00 | 0 |

*Lower because the emulsion was so stable the water wetting of the cement particles occurred at a slower rate.

Compressive strength determined after 20 hours at 150° F.

EXAMPLE 2

This Example simply shows the successful preparation of a cementitious slurry as in Example I, with a different Portland cement and different surfactant. Compressive strength was not determined.

Base Oil: Mineral oil Grade 9NF
Cement Type: API Class H
Base Mud: Fresh Water+20 lbs/bbl Bentonite+0.05 lb/bbl "DRISPAC" Regular+25 lb/bbl "REV-DUST" (simulated drill solids). Density: 9.2 lbs/gal 350 mls Mineral Oil+8.64 g Sorbitan monooleate, 20 mole ethoxylate ("TWEEN 60")[1]+5.76 g quaternary ammonium chloride surfactant ("ARQUAD C-50")[2]+1200 g Class H cement. Final density of oil cement slurry mixture: 16.77 lbs/gal.

[1] "TWEEN 60" is the trade name of ICI Americas Inc.
[2] "ARQUAD C-50" is a tradename of AKZO Chemical.

| Volume Fraction Cement Oil Slurry | Volume Fraction Water Base Mud | Final Density lbs/gal | Volume Percent Cement Solids in Mixture |
| --- | --- | --- | --- |
| 1 | 0 | 16.77 | 51.22 |
| 0.95 | 0.05 | 16.4 | 48.66 |
| 0.9 | 0.1 | 16.0 | 46.10 |
| 0.85 | 0.15 | 15.6 | 43.53 |
| 0.8 | 0.2 | 15.3 | 40.97 |
| 0.75 | 0.25 | 14.9 | 38.41 |
| 0.7 | 0.3 | 14.5 | 35.85 |
| 0.65 | 0.35 | 14.1 | 33.29 |
| 0.6 | 0.4 | 13.7 | 30.73 |
| 0.55 | 0.45 | 13.4 | 28.17 |
| 0.5 | 0.5 | 13.0 | 25.61 |
| 0.45 | 0.55 | 12.6 | 23.05 |
| 0.4 | 0.6 | 12.2 | 20.49 |
| 0.35 | 0.65 | 11.8 | 17.93 |
| 0.3 | 0.7 | 11.5 | 15.37 |
| 0.25 | 0.75 | 11.1 | 12.80 |
| 0.2 | 0.8 | 10.7 | 10.24 |
| 0.15 | 0.85 | 10.3 | 7.68 |
| 0.1 | 0.9 | 10.0 | 5.12 |
| 0.05 | 0.95 | 9.6 | 2,56 |
| 0 | 1 | 9.2 | 0 |

Compressive strength determined after 24 hours at 150° F.

While this invention has been described in detail for the purpose of illustration it is not to be construed to be limited thereby but is intended to cover all changes and modifications within the spirit and scope thereof.

What is claimed is:

1. A method of drilling and cementing comprising drilling a wellbore with a drill string comprising a drill pipe utilizing an aqueous drilling fluid; circulating said drilling fluid down said drill pipe and up an annulus between said drill pipe and walls of said wellbore, thus laying down a filter cake on said walls of said wellbore during said drilling; withdrawing said drill string and inserting a pipe; and introducing a cementitious slurry into and down the pipe and up an annulus between said pipe and the walls of said wellbore, said cementitious slurry being prepared by combining (a) an aqueous drilling fluid; and
(b) a slurry of Portland cement and oil.

2. A method according to claim 1 wherein said cementitious slurry is passed down said pipe in direct fluid contact with drilling fluid in said pipe to displace the said drilling fluid out of said pipe and up said annulus, said method comprising in addition passing a displacement fluid into direct fluid contact with said cementitious slurry to displace said cementitious slurry down said pipe and up into said annulus.

* * * * *